Nov. 25, 1969     R. E. CUSHING     3,480,031

ELECTRO-PNEUMATIC TRANSDUCER

Filed Oct. 14, 1965

INVENTOR.
RUSSELL E. CUSHING
BY Dallett Hoopes
ATTORNEY

3,480,031
ELECTRO-PNEUMATIC TRANSDUCER
Russell Emery Cushing, Gibraltar, Mich., assignor to Pennsalt Chemicals Corporation, Philadelphia, Pa., a corporation of Pennsylvania
Filed Oct. 14, 1965, Ser. No. 496,082
Int. Cl. F15b 5/00; G05d 16/20; G05f 5/00
U.S. Cl. 137—82      9 Claims

ABSTRACT OF THE DISCLOSURE

An electro-pneumatic transducer comprising a wattmeter torque motor for sensing power in an electrical circuit and in response thereto urging a flapper against the stream of air emitted from the nozzle of a pneumatic relay. The output pressure of the pneumatic relay is thereby proportionally modulated in response to electrical power for providing control of process variables dependent upon electrical load conditions.

---

This invention relates to a control device adapted to control the intensity of a fluid pressure in accordance with the magnitude of an electric power requirement. For example, when installed in an electric power circuit, an embodiment of the invention will measure the electric power requirement of the circuit and regulate the pressure in a pneumatic system in accordance therewith.

In industrial installations it is frequently desirable to operate various elements in accordance with fluctuations in electric power requirement of an electric load. Such elements may, for instance, be an air-actuated electric switch, a pneumatic recording or indicating device, or a pressure-operated metering valve adapted to control fluid flow in a process line. Often it is not convenient or practical to have these elements themselves operated electrically but it is convenient and cheap to have them operated by pneumatic pressure, pneumatic pressure being available at most industrial sites and extensively used in process control systems.

The invention provides a simple and inexpensive control for a pneumatic pressure line in accordance with power requirements of an associated electrical line. An especially desirable feature is that a significant part of the structure of an apparatus embodying the invention may be part of a conventional and readily available electric watt hour meter. The simplicity of the invention is especially noteworthy when it recognized that the control by the apparatus of pneumatic pressure can be made substantially linear with respect to the power variation.

Other objects of the invention will be apparent from reference to the following specification and attached drawings forming a portion thereof.

Figure 1:
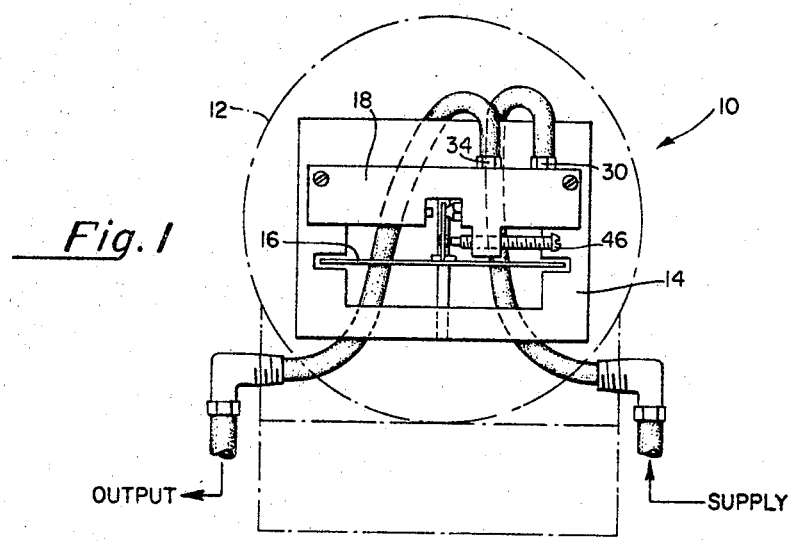
FIGURE 1 is a front elevation of an apparatus embodying the invention and having the outline of the conventional watt hour meter in phantom.

Referring more specifically to the drawings, an apparatus embodying the invention is generally designated 10 in FIGURE 1. It preferably comprises a watt hour meter 12 such as is used to measure the alternating current power consumed by a private residence. For the invention the conventional meter is modified by removing its dial indicators. The adapted meter includes the conventional frame 14 having windings (not shown) which exert a magnetic field on the rotor 16 to tend to turn it.

Figure 2:
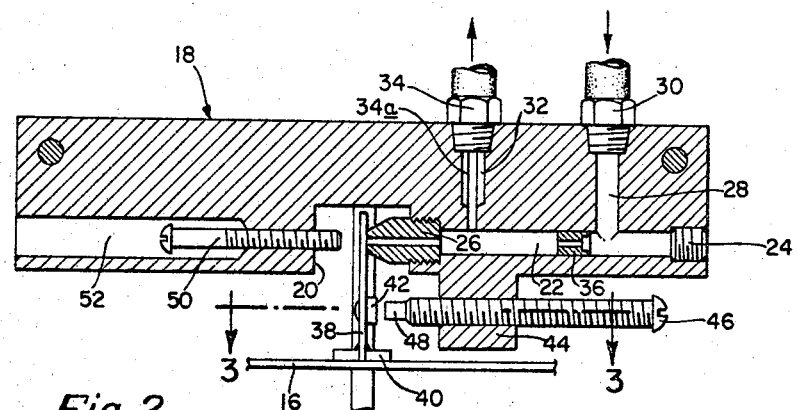
FIGURE 2 is an enlarged view partly in section of a portion of the apparatus shown in FIGURE 1.

Suitably mounted on the frame 14 is the pneumatic block 18. The block is provided with a recess 20 generally in line with the shaft of the rotor 16 and forward thereof. As shown in FIGURE 2 the block is provided with a pneumatic passage 22 sealed by a plug 24 at one end and provided with a nozzle 26 at the other in that portion of the block to the right of recess 20. An inlet passage 28 communicates with the passage 22 and is provided with a fitting 30 for a pneumatic inlet line.

Toward the nozzle 26 from the juncture of the inlet passage 28 and the pneumatic passage 22, a third passage, outlet passage 32 is provided and communicates also with the pneumatic passage 22. The outlet passage 32 is provided with a fitting 34 for connection to the regulated pneumatic outlet line. Preferably the inlet to the fitting 34 comprises the damping capillary tube 34a which may be internally 0.003 inch in diameter and one-half inch long. It extends between the fitting 34 and a restriction at the base of passage 32 as shown. The tube serves to avoid a pulsing of the pressure in the outlet line and has been found most effective when positioned as close to the passage 22 as possible.

A restriction bushing 36 is fitted into the pneumatic passage 22 intermediate the junctures of the inlet and outlet passages 28 and 32. The bore through the bushing 36 is preferably smaller than that of the nozzle 26. For instance, the bushing bore may be .012 inch in diameter while the nozzle bore may be 0.024 inch in diameter. The result is that the fluid flow through the bushing 36 is insufficient to satisfy an unhampered flow through the nozzle 26 so that if the nozzle 26 is not obstructed, pneumatic pressure in the outlet line attached to fitting 34 will approach zero.

Figure 3:
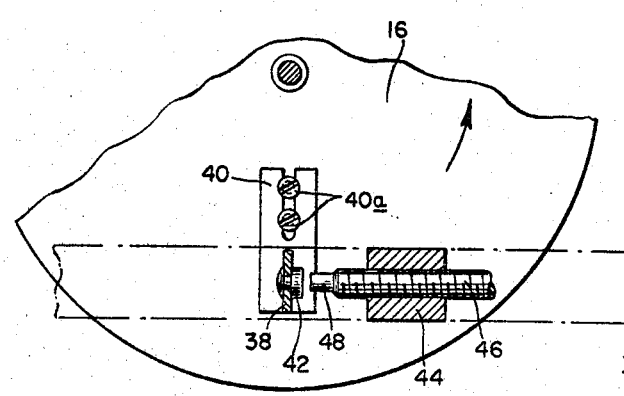
FIGURE 3 is a fragmentary sectional view taken on the line 3—3 of FIGURE 2.

Control for the outlet of the nozzle 26 is provided by a nozzle-obstructing element 38, or flapper. This element may be of aluminum and is mounted as shown in FIGURE 3 to extend perpendicularly upward from the rotor disc 16 at a point spaced from the center thereof. Preferably the base of the nozzle-obstructing element 38 is secured into a slot in its base plate 40 which in turn is slotted and attached to the rotor disc by screws 40a in such manner that it may be adjusted radially.

It will be understood that the rotor disc 16 is adapted for the present invention does not rotate as in the conventional use of the meter. Instead it is urged in a counterclockwise direction (FIG. 3) with a torque generally corresponding to the measure of electric power used in the electrical circuit in which the meter is installed. At the same time it is urged in a clockwise direction (FIG. 3) by the flow of air through the nozzle against the nozzle-obstructing element 38. These two opposing forces create a "force balance" system. In effect the nozzle and nozzle-obstructing element comprise a bleed valve to control the regulated pressure. Rhythmic movement of the disc and nozzle-obstructing element is substantially avoided by the damping action of capillary tube 34a.

It has been found in an apparatus embodying the invention that the pneumatic pressure in the outlet line varies in substantially linear fashion with respect to variations in the power required in the electrical line. Thus the regulated pneumatic pressure issuing from fitting 34 can be used to great advantage to drive for instance a pneumatic watt hour recording device recording the electrical power in the circuit in which the meter is installed.

To control the position of the nozzle-obstructing element 38 in a position not remote from the nozzle 26, the nozzle-obstructing element may be itself of ferrous metal or be provided with an iron button 42 spaced above the disc 16. A boss 44 may extend downward from the block 18. The boss may be horizontally drilled and tapped to receive a set screw 46. On its leftward end (FIG. 2) the set screw 46 mounts a permanent magnet 48 to attract the iron button 42 and hence the nozzle-obstructing element. The position of the set screw 46 may be adjusted so that at zero electrical load, that is when no power is flowing through the electrical line, the pneumatic outlet line has a low and positive pressure which is duplicated at every return to no-load conditions.

While the general arrangement including the set screw 46 having a permanent magnet 48 on its tip is the preferred way for controlling the zero-reading position of the obstructing element 38 since it is so readily adjusted, it is obvious that the positioning of the element 38 may also be controlled by a helical spiral spring disposed about the shaft of the rotor disc 16 and secured at one end to the frame 14 and at the other end to the disc, or by a coiled spring secured to the element 38 on one end and to a tension adjusting screw held by block 18 on the other.

A stop screw 50 is installed in a bore 52 in the block to the left of recess 20 (FIG. 2) and on the same axis as that of the passage 22. This serves to prevent the accidental displacement of the nozzle-obstructing element in a clockwise direction beyond the field of influence of magnet 48.

Illustratively, an actual apparatus as represented in FIGURE 1 was installed in the electric line of a 5 horsepower A.C. motor, using an appropriate voltage transformer. The pneumatic source connected to the inlet fitting 30 was adjusted to 20 p.s.i.g. Depending on the load on the motor the regulated outlet pressure varied from 3 to 15 p.s.i.g. The relationship between power and pressure was found to be substantially linear. The outlet pressure was remarkably stable and was connected to an air-actuated switch which gave an alarm when the load dropped sufficiently to indicate a broken drive belt to the driven machinery. The load was continuously recorded and the record provided both an operating guide and a record of the exact time of belt failure.

I claim:
1. An electro-penumatic transducer comprising sensing means for electrically measuring power in an electrical circuit and developing an output torque proportional thereto, flapper means responsive to the output torque of said sensing means and rotatable in a predetermined direction, and means constituting a pneumatic relay impinging a stream of gas against said flapper means opposing said output torque and having an output pressure proportionally modulated by the degree of torque exerted by said sensing means, said sensing means constituting a wattmeter including a rotatable disk, and said flapper means including a vane supported on said disk perpendicular to the plane thereof and rotatable therewith, whereby said output pressure is related to the electrical power in the circuit.

2. The electro-pneumatic transducer of claim 1 wherein said wattmeter constitutes a watt hour meter torque motor having time integrating components decoupled therefrom.

3. The electro-pneumatic transducer of claim 1 wherein said pneumatic relay comprises a nozzle directed toward said flapper means, a housing having a chamber in communication with said nozzle, means for connecting said chamber with a regulated source of air under pressure, an outlet line communicating with said chamber, and pneumatic control means coupled with the outlet line for controlling a process variable in response to variations in electrical load conditions.

4. The electro-pneumatic transducer of claim 3 including a restriction in said chamber intermediate said outlet line and said source of air, said restriction having an orifice smaller than that of said nozzle.

5. The electro-pneumatic transducer of claim 4 including a damping capillary intermediate said outlet line and said chamber.

6. The electro-pneumatic transducer of claim 3 including biasing means to urge said flapper means against said nozzle with a predetermined force.

7. The electro-pneumatic transducer of claim 6 wherein said biasing means comprises means to exert magnetic attractive force.

8. The electro-pneumatic transducer of claim 7 including an adjustable limit stop normally disposed in spaced orientation from said flapper means on the opposite side from said nozzle.

9. The electro-pneumatic transducer of claim 8 including adjustable means for supporting said means for exerting the magnetic attractive force so as to vary the degree of force under zero power conditions.

References Cited
UNITED STATES PATENTS

| | | | |
|---|---|---|---|
| 2,387,858 | 10/1945 | Russel | 25—65 X |
| 2,637,762 | 5/1953 | Lunas | 324—137 |
| 2,884,905 | 5/1959 | Jensen | 137—82 X |
| 3,099,995 | 8/1963 | Raufenbarth | 137—82 |
| 3,113,582 | 12/1963 | Hudson | 137—85 X |
| 3,055,383 | 9/1962 | Paine | 137—85 |
| 3,174,499 | 3/1965 | Mott | 137—82 |
| 3,223,105 | 12/1965 | Hogel | 137—85 |
| 3,324,392 | 6/1967 | Roberts | 324—137 X |

ALAN COHAN, Primary Examiner